US010099698B2

(12) United States Patent
Matsubara et al.

(10) Patent No.: US 10,099,698 B2
(45) Date of Patent: Oct. 16, 2018

(54) CONTROL APPARATUS FOR VEHICLE AND CONTROL METHOD

(71) Applicant: TOYOTA JIDOSHA KABUSHIKI KAISHA, Toyota-shi, Aichi-ken (JP)

(72) Inventors: Keigo Matsubara, Nagoya (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 15/432,313

(22) Filed: Feb. 14, 2017

(65) Prior Publication Data

US 2017/0240179 A1  Aug. 24, 2017

(30) Foreign Application Priority Data

Feb. 24, 2016  (JP) .................................. 2016-033296

(51) Int. Cl.
| | |
|---|---|
| *B60W 30/19* | (2012.01) |
| *B60W 10/02* | (2006.01) |
| *B60W 10/115* | (2012.01) |
| *B60W 10/08* | (2006.01) |
| *B60W 10/11* | (2012.01) |

(52) U.S. Cl.
CPC .......... *B60W 30/19* (2013.01); *B60W 10/023* (2013.01); *B60W 10/026* (2013.01); *B60W 10/08* (2013.01); *B60W 10/11* (2013.01); *B60W 10/115* (2013.01); *B60W 2510/0676* (2013.01); *B60W 2510/107* (2013.01); *B60W 2710/024* (2013.01); *B60W 2710/025* (2013.01); *Y10T 477/635* (2015.01); *Y10T 477/6352* (2015.01); *Y10T 477/63385* (2015.01); *Y10T 477/735* (2015.01)

(58) Field of Classification Search
CPC ......... Y10T 477/63385; Y10T 477/635; Y10T 477/6352; Y10T 477/735; B60W 30/19; B60W 10/023; B60W 10/0296; B60W 2710/025; B60W 2710/024
USPC ........................................................... 701/56
See application file for complete search history.

(56) References Cited

U.S. PATENT DOCUMENTS

| | | | | |
|---|---|---|---|---|
| 5,133,232 A | * | 7/1992 | Kikuchi | ............... B60W 10/06 192/3.29 |
| 5,347,885 A | * | 9/1994 | Taga | ................... F16H 61/0213 477/65 |

(Continued)

FOREIGN PATENT DOCUMENTS

JP        2009-097603 A        5/2009

OTHER PUBLICATIONS

U.S. Appl. No. 15/432,231, filed Feb. 14, 2017 in the name of Matsubara et al.

*Primary Examiner* — Roger L Pang
(74) *Attorney, Agent, or Firm* — Oliff PLC

(57) ABSTRACT

In the case where the lockup clutch is in the complete engagement state when a changeover between shift stages is made with the second shift mode selected, an electronic control unit holds the lockup clutch in the complete engagement state. Meanwhile, in the case where the lockup clutch is in the slip engagement state, the electronic control unit holds the lockup clutch in the slip engagement state based on a slip amount of the torque converter, or switches the lockup clutch to the complete engagement state.

8 Claims, 12 Drawing Sheets

(56) References Cited

U.S. PATENT DOCUMENTS 5,545,107 A * 8/1996 Ochiai ............... F16H 61/143
477/169
7,901,321 B2 * 3/2011 Ferrier ............... F16H 61/143
477/64

* cited by examiner

FIG. 4

|  | CLUTCHES ||||  BRAKES ||
|  | C1 | C2 | C3 | C4 | B1 | B2 |
|---|---|---|---|---|---|---|
| FIRST SPEED | ○ | — | — | — | — | ○ |
| SECOND SPEED | ○ | — | — | — | ○ | — |
| THIRD SPEED | ○ | — | ○ | — | — | — |
| FOURTH SPEED | ○ | — | — | ○ | — | — |
| FIFTH SPEED | ○ | ○ | — | — | — | — |
| SIXTH SPEED | — | ○ | — | ○ | — | — |
| BACKWARD | — | — | ○ | — | — | ○ |

CONTROL APPARATUS FOR VEHICLE AND CONTROL METHOD

INCORPORATION BY REFERENCE

The disclosure of Japanese Patent Application No. 2016-033296 filed on Feb. 24, 2016 including the specification, drawings and abstract is incorporated herein by reference in its entirety.

BACKGROUND

1. Technical Field

The disclosure relates to a control apparatus for a vehicle and a control method that change over a lockup clutch that is attached to a torque converter to one of a complete engagement state, a slip engagement state and a complete release state in accordance with an operating state of the vehicle.

2. Description of Related Art

In the case where an automatic transmission that combines a plurality of planetary gear trains with a plurality of frictional engagement elements is connected to an internal combustion engine for a vehicle, a torque converter is generally incorporated between this internal combustion engine and the automatic transmission. Besides, it is common to assemble a lockup clutch with the torque converter for this vehicle so that this lockup clutch can be changed over to one of a complete engagement state, a slip engagement state and a complete release state in accordance with an operating state of the vehicle. Japanese Patent Application Publication No. 2009-097603 (JP 2009-097603 A) discloses a control apparatus for a vehicle that is mounted with a torque converter to which such a lockup clutch is attached, as well as an automatic transmission. In this Japanese Patent Application Publication No. 2009-097603 (JP 2009-097603 A), when the deceleration of the vehicle is equal to or larger than a deceleration threshold, the lockup clutch is switched from an engagement state to a release state to prevent an engine from stalling. Besides, when sport running is selected as a shift mode or when an accelerator pedal is depressed, the foregoing deceleration threshold is changed to a larger value to make the lockup clutch unlikely to be switched to the release state.

SUMMARY

In recent years, with a view to attempting to improve fuel economy, a lockup clutch is controlled, if at all possible, to a complete engagement state in an operation region of a vehicle in which a torque amplification effect by a torque converter is not obtained. Besides, even in an operation region in which the lockup clutch cannot be completely engaged, the lockup clutch is held in a slip engagement state except in an operation region in which the lockup clutch needs to be rendered in a complete release state. Thus, the driving force from an engine is restrained to the utmost from being lost, and a further improvement in fuel economy is made possible. In this regard, the aforementioned Japanese Patent Application Publication No. 2009-097603 (JP 2009-097603 A) does not take into account cases where the lockup clutch is in the slip engagement state. In particular, this publication does not consider what state the lockup clutch should be controlled to at the time of shifting in each shift mode, except when the vehicle is braked.

It is desirable to appropriately make a changeover among the complete engagement state, the slip engagement state and the complete release state of the lockup clutch in shifting an automatic transmission in various shift modes selected by a driver, and ensure more suitable drivability including the alleviation of a shift shock.

The disclosure realizes a control apparatus for a vehicle and a control method that make it possible to ensure drivability that is more suited than before for a shift mode selected by a driver at the time of shifting.

An example aspect of the present disclosure provides a control apparatus for a vehicle, the vehicle includes an engine, a torque converter connected to the engine, the torque converter including a pump impeller and a turbine runner, a lockup clutch provided between the pump impeller and the turbine runner, the lockup clutch being configured to change over to one of a complete engagement state, a slip engagement state and a complete release state in accordance with an operating state of the vehicle, and an automatic transmission connected to the engine via the torque converter, the automatic transmission including shift stages, the automatic transmission being configured such that a first shift mode or a second shift mode is selected by a driver, a region of each of the shift stages being set such that, at the same throttle opening degree and the same shift stage, the region in the second shift mode is offset toward a higher engine speed side with respect to the region in the first shift mode, the control apparatus includes an electronic control unit configured to i) hold the lockup clutch in the complete engagement state when the second shift mode is selected and a changeover between the shift stages is made with the lockup clutch being in the complete engagement state, and ii) hold the lockup clutch in the slip engagement state or switch the lockup clutch to the complete engagement state, when the second shift mode is selected and a changeover between the shift stages is made with the lockup clutch being in the slip engagement state. An example aspect of the present disclosure provides a control method for a vehicle, the vehicle includes an engine, a torque converter connected to the engine, the torque converter including a pump impeller and a turbine runner, a lockup clutch provided between the pump impeller and the turbine runner, the lockup clutch being configured to change over to one of a complete engagement state, a slip engagement state and a complete release state in accordance with an operating state of the vehicle, an automatic transmission connected to the engine via the torque converter, the automatic transmission including shift stages, the automatic transmission being configured such that a first shift mode or a second shift mode is selected by a driver, a region of each of the shift stages being set such that, at the same throttle opening degree and the same shift stage, the region in the second shift mode is offset toward a higher engine speed side with respect to the region in the first shift mode, and an electronic control unit, the control method includes i) holding the lockup clutch in the complete engagement state by the electronic control unit when the second shift mode is selected and a changeover between the shift stages is made with the lockup clutch being in the complete engagement state, and ii) holding the lockup clutch in the slip engagement state or switching the lockup clutch to the complete engagement state, by the electronic control unit, when the second shift mode is selected and a changeover between the shift stages is made with the lockup clutch being in the slip engagement state.

In the control apparatus, the electronic control unit may be configured to, when the second shift mode is selected and a changeover between the shift stages is made with the lockup clutch being in the slip engagement state, i) hold the lockup clutch in the slip engagement state when a rotation difference between the pump impeller and the turbine runner of the torque converter is larger than a predetermined rotation difference, and ii) switch the lockup clutch to the complete engagement state when the rotation difference between the pump impeller and the turbine runner of the torque converter is equal to or smaller than the predetermined rotation difference.

In the control apparatus, the electronic control unit may be configured to i) switch the lockup clutch to the slip engagement state when the first shift mode is selected and a changeover between the shift stages is made with the lockup clutch being in the complete engagement state, and ii) hold the lockup clutch in the slip engagement state when the first shift mode is selected and a changeover between the shift stages is made with the lockup clutch being in the slip engagement state. The electronic control unit may be configured to switch the lockup clutch to the slip engagement state after a rotational speed of the pump impeller of the torque converter changes, when the first shift mode is selected and a changeover between the shift stages is made with the lockup clutch being in the complete engagement state.

In the control apparatus, the electronic control unit may be configured to switch the lockup clutch to the slip engagement state after a rotational speed of the pump impeller of the torque converter changes, when the first shift mode is selected and a changeover between the shift stages is made with the lockup clutch being in the complete engagement state.

In the control apparatus, the electronic control unit may be configured to hold the lockup clutch in the complete release state regardless of a changeover between the shift stages, when the lockup clutch is in the complete release state. The electronic control unit may be configured to control the lockup clutch such that the lockup clutch is in the complete release state, when at least one of an engine coolant temperature and an oil temperature of automatic transmission oil is equal to or lower than a first predetermined temperature or when the oil temperature of the automatic transmission oil is equal to or higher than a second predetermined temperature that is higher than the first predetermined temperature.

The control apparatus for the vehicle according to the disclosure makes it possible to ensure more suitable drivability as to the second shift mode selected by the driver, even in shifting the automatic transmission.

By switching the lockup clutch to the slip engagement state when the lockup clutch is in the complete engagement state at the time of shifting in the first shift mode, and holding the lockup clutch in the slip engagement state when the lockup clutch is in the slip engagement state, more suitable drivability can be ensured as to the first shift mode as well.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein:

FIG. 4 is a shift engagement chart representing a relationship between respective shift stages and frictional engagement elements to be engaged correspondingly thereto in the embodiment of the disclosure shown in FIG. 3;

DETAILED DESCRIPTION OF EMBODIMENT

The embodiment of the disclosure in which a control apparatus for a vehicle according to the disclosure is applied to a vehicle that is mounted with a spark ignition-type multi-cylinder internal combustion engine will be described in detail with reference to FIGS. 1 to 12. However, the disclosure is not limited to this embodiment thereof, and the configuration of the disclosure can be appropriately changed in accordance with the characteristics required for objects to which the disclosure is applied.

Figure 1:
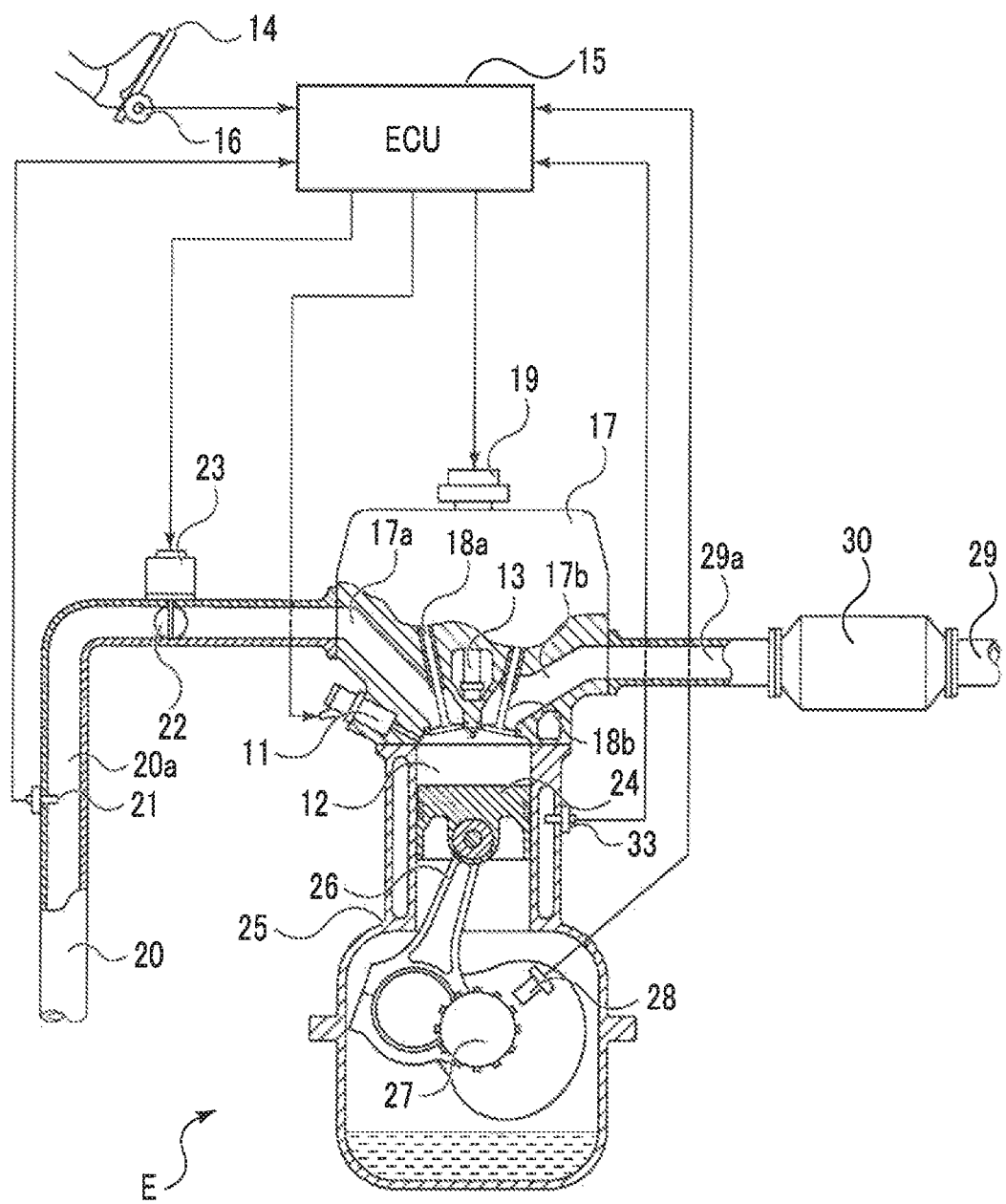
FIG. 1 is a conceptual view of an engine system in the embodiment of the disclosure in which a control apparatus for a vehicle according to the disclosure is applied to a vehicle that is mounted with a spark ignition-type multi-cylinder internal combustion engine.
Figure 2:
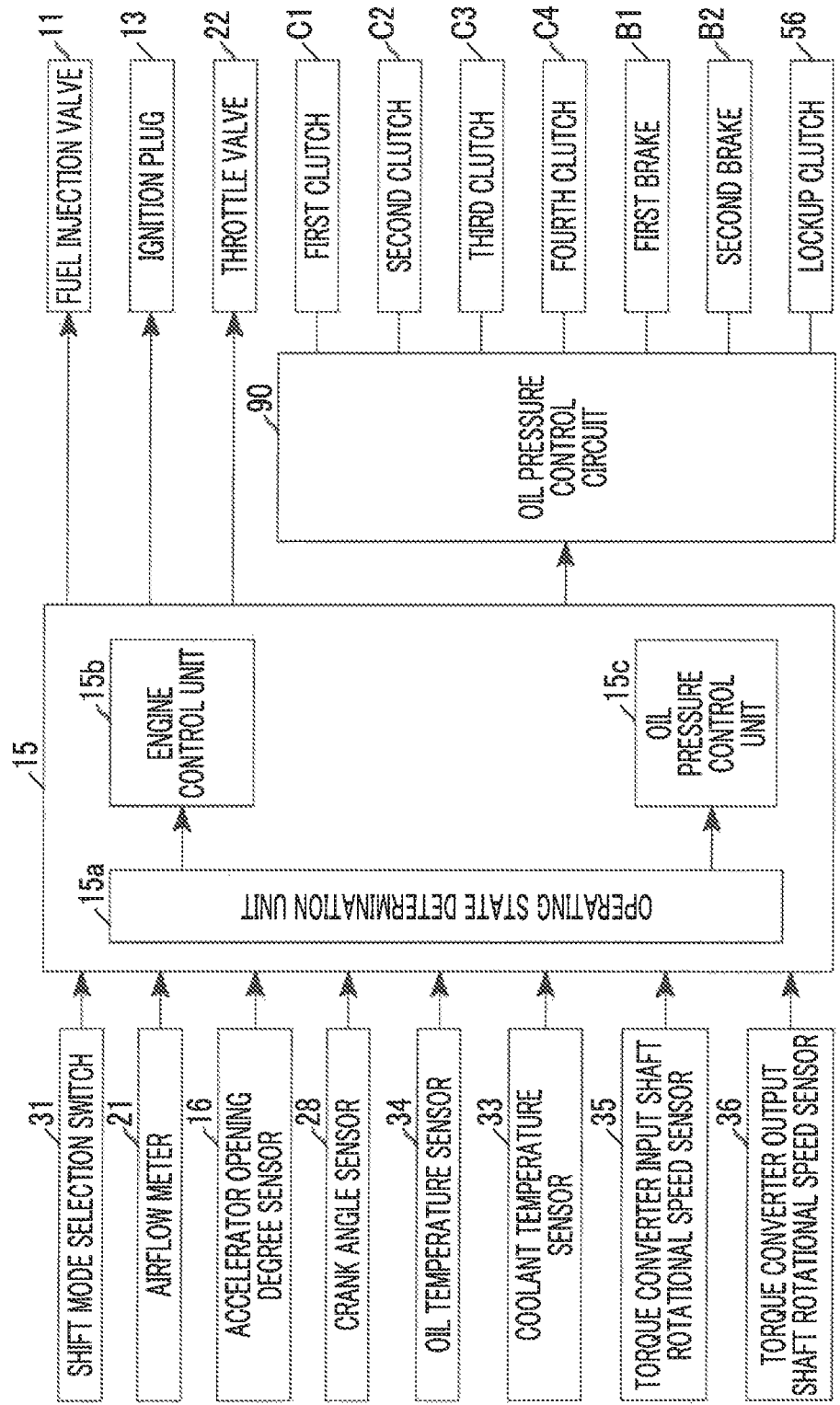
FIG. 2 is a main control block diagram of the embodiment of the disclosure shown in FIG. 1.

FIG. 1 shows the concept of an engine system in the present embodiment of the disclosure. FIG. 2 shows control blocks in this engine system. Incidentally, various auxiliaries and the like required for smooth operation of an engine E are omitted in FIG. 1 for the sake of convenience.

The engine E in the present embodiment of the disclosure is a spark ignition-type multi-cylinder internal combustion engine in which a fuel such as gasoline, alcohol, the mixture thereof, liquefied natural gas or the like is directly injected from a fuel injection valve 11 into a combustion chamber 12 and the fuel is ignited by an ignition plug 13, but is not limited thereto. The amount of the fuel supplied from the fuel injection valve 11 into the combustion chamber 12, the timing of fuel injection and the ratio of fuel injection are controlled by an electronic control unit (an ECU) 15, based on an operating state of the vehicle including an amount of depression of an accelerator pedal 14 by a driver. The depression amount of the accelerator pedal 14 is detected by an accelerator opening degree sensor 16, and the detected information is output to the ECU 15.

A valve operating mechanism (not shown) that includes an intake valve 18a and an exhaust valve 18b is incorporated in a cylinder head 17 through which an intake port 17a and an exhaust port 17b, which face the combustion chamber 12, are formed. Besides, the foregoing fuel injection valve 11, the ignition plug 13 that ignites an air-fuel mixture in the combustion chamber 12, an ignition coil 19 that produces sparks in this ignition plug 13 and the like are also attached to this cylinder head 17.

An airflow meter 21 and a throttle valve 22 are incorporated in an intake pipe 20 that is coupled to the cylinder head 17 in such a manner as to communicate with the intake port 17a and that defines an intake passage 20a together with the intake port 17a. The airflow meter 21 detects a flow rate of intake air flowing through the intake passage 20a and outputs this detected flow rate of intake air to the ECU 15. The throttle valve 22, which is arranged downstream of this airflow meter 21 in the intake pipe 20, adjusts an opening degree of the intake passage 20a via a throttle actuator 23, based on a depression amount of the accelerator pedal 14. In the present embodiment of the disclosure, the operation of depressing the accelerator pedal 14 and the operation of opening/closing the throttle valve 22 are mechanically separated from each other, and the operation of opening/closing the throttle valve 22 can be electrically controlled through the use of the throttle actuator 23. However, the accelerator pedal 14 and the throttle valve 22 may be mechanically coupled to each other. In this case, the throttle actuator 23 is not required.

A crank angle sensor 28 that detects a rotational phase of a crankshaft 27 to which a piston 24 is coupled via a connecting rod 26, namely, a crank angle and that outputs this detected crank angle to the ECU 15 is attached to a cylinder block 25 in which the piston 24 moves in a reciprocating manner. In the present embodiment of the disclosure, an operating state determination unit 15a of the ECU 15 calculates an engine rotational speed $N_E$ based on information from this crank angle sensor 28. However, an engine rotational speed sensor may be provided independently.

An exhaust gas purification device 30 for detoxifying noxious substances that are produced through the combustion of the air-fuel mixture in the combustion chamber 12 is incorporated in an exhaust pipe 29 that is coupled to the cylinder head 17 in such a manner as to communicate with the exhaust port 17b and that defines an exhaust passage 29a together with the exhaust port 17b.

An engine control unit 15b of the ECU 15 controls the operation of the aforementioned fuel injection valve 11, the ignition timing of the ignition plug 13, the opening degree of the throttle valve 22 and the like, based on a result of determination on the operating state of the vehicle by the operating state determination unit 15a.

Figure 3:
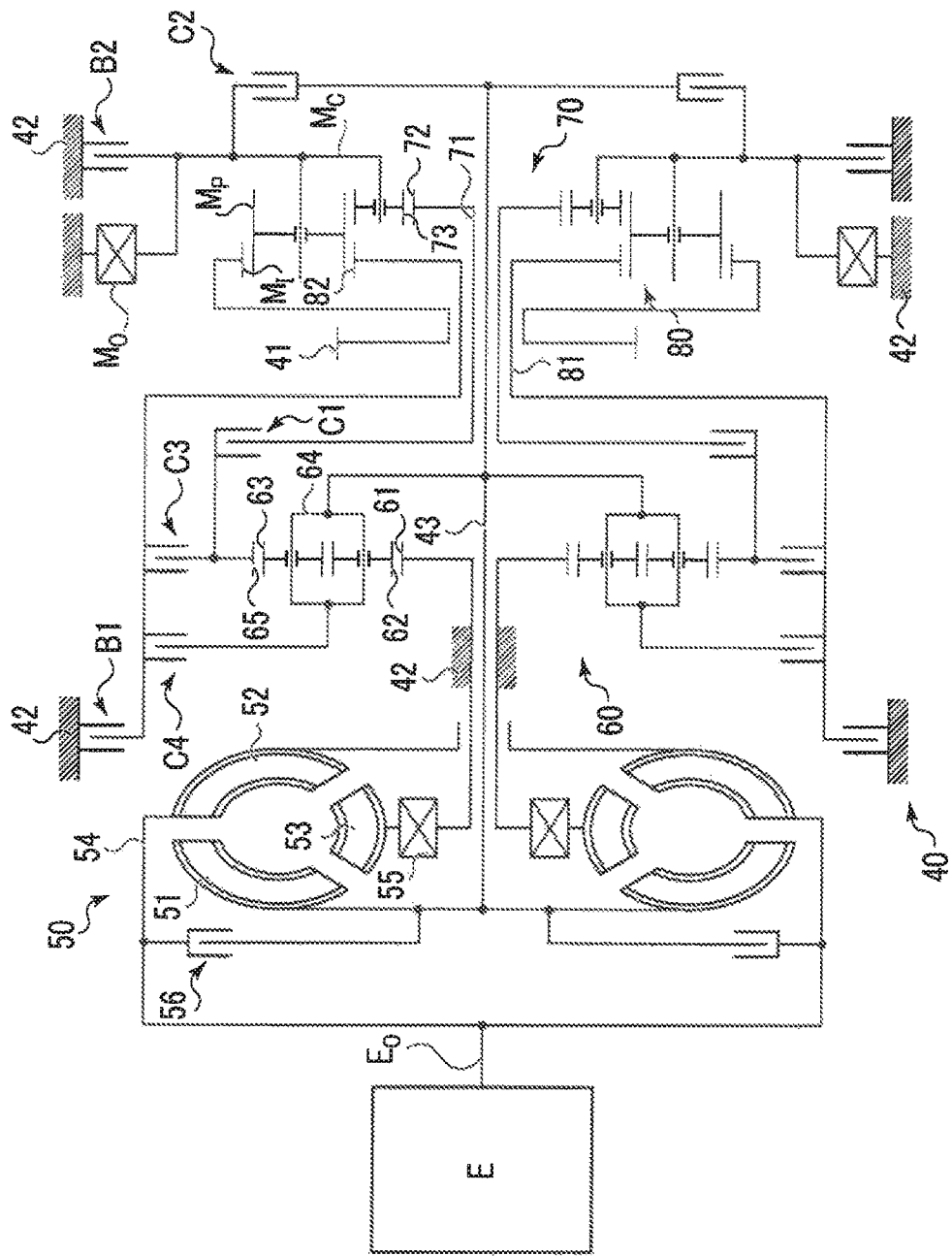
FIG. 3 is a schematic view of a gear train in the embodiment of the disclosure shown in FIG. 1.

FIG. 3 schematically shows a gear train extending from the engine E to an automatic transmission 40 in the present embodiment of the disclosure. That is, the automatic transmission 40 is connected to an output shaft $E_O$ of the engine E that is mounted in the vehicle in the present embodiment of the disclosure, via a torque converter 50. An output gear 41 of this automatic transmission 40 is connected to a driving wheel side of the vehicle (not shown). The automatic transmission 40 in the present embodiment of the disclosure is equipped with a first planetary gear train 60, a second planetary gear train 70, a third planetary gear train 80, and six frictional engagement elements C1 to C4, B1 and B2 whose engagement/release is hydraulically controlled.

The first planetary gear train 60 is constituted of a first sun gear 61 that is fixed to a transmission case 42, a first inner planetary gear 62 that meshes with this first sun gear 61, a first outer planetary gear 63 that meshes with this first inner planetary gear 62, a first carrier 64 that rotatably supports this first inner planetary gear 62 and this first outer planetary gear 63, and a first internal gear 65 that meshes with the first outer planetary gear 63. The first carrier 64 is integrally coupled to an input shaft 43 of the automatic transmission 40 that is rotatably supported by the transmission case 42 together with a turbine runner 51 of the torque converter 50 that will be described later.

The second planetary gear train 70 and the third planetary gear train 80 are configured to share a planetary gear (hereinafter referred to as a composite planetary gear $M_P$), a carrier (hereinafter referred to as a composite carrier $M_C$) and an internal gear (hereinafter referred to as a composite internal gear $M_I$). The composite carrier $M_C$ is supported by the transmission case 42 via a one-way clutch $M_O$. The composite planetary gear $M_P$ that is rotatably supported by this composite carrier $M_C$ meshes with the composite internal gear $M_I$ integrated with the output gear 41 of the automatic transmission 40 while being surrounded thereby.

The second planetary gear train 70 is further equipped with a second sun gear 72 and an inner planetary gear 73. The second sun gear 72 is integrated with an inner hollow shaft 71 that is rotatably supported by the input shaft 43 of the automatic transmission 40. The inner planetary gear 73 is rotatably attached to the composite carrier $M_C$ together with the composite planetary gear $M_P$, and meshes with the second sun gear 72 and the composite planetary gear $M_P$.

The third planetary gear train 80 is constituted of a third sun gear 82, the foregoing composite planetary gear $M_P$, the foregoing composite carrier $M_C$ and the foregoing composite internal gear $M_I$. The third sun gear 82 is integrated with an outer hollow shaft 81 that is rotatably supported by the inner hollow shaft 71. The composite planetary gear Mp meshes with this third sun gear 82.

The inner hollow shaft 71 has the second sun gear 72 of the second planetary gear train 70 formed on one end side thereof. The first internal gear 65 of the first planetary gear train 60 and the other end side of the inner hollow shaft 71 are connected to each other via the first clutch C1 as the frictional engagement element. Besides, the composite carrier $M_C$ and the input shaft 43 of the automatic transmission 40 are connected to each other via the second clutch C2 as the frictional engagement element. Furthermore, the outer hollow shaft 81 has the third sun gear 82 of the third planetary gear train 80 formed on one end side thereof. The first internal gear 65 and the first carrier 64 of the first planetary gear train 60 are connected to the other end side of the outer hollow shaft 81 via the third clutch C3 and the fourth clutch C4 as the frictional engagement elements, respectively.

The third sun gear 82 of the third planetary gear train 80 is provided on one end side of the outer hollow shaft 81. The first brake B1 as the frictional engagement element is provided between the other end side of the outer hollow shaft 81 and the transmission case 42. Besides, the second brake B2 as the frictional engagement element is provided between the composite carrier $M_C$ and the transmission case 42.

FIG. 4 is an engagement chart showing a relationship between respective shift stages and engagement/non-engagement states of frictional engagement elements C1 to C4, B1 and B2. However, in the disclosure, the configuration of the automatic transmission 40 itself is not limited at all. Therefore, all kinds of automatic transmissions other than that of the aforementioned embodiment of the disclosure can be adopted. Besides, instead of such a transmission, a continuously variable transmission (a CVT) that can change the speed ratio stepwise can also be adopted as a matter of course.

Figure 5:
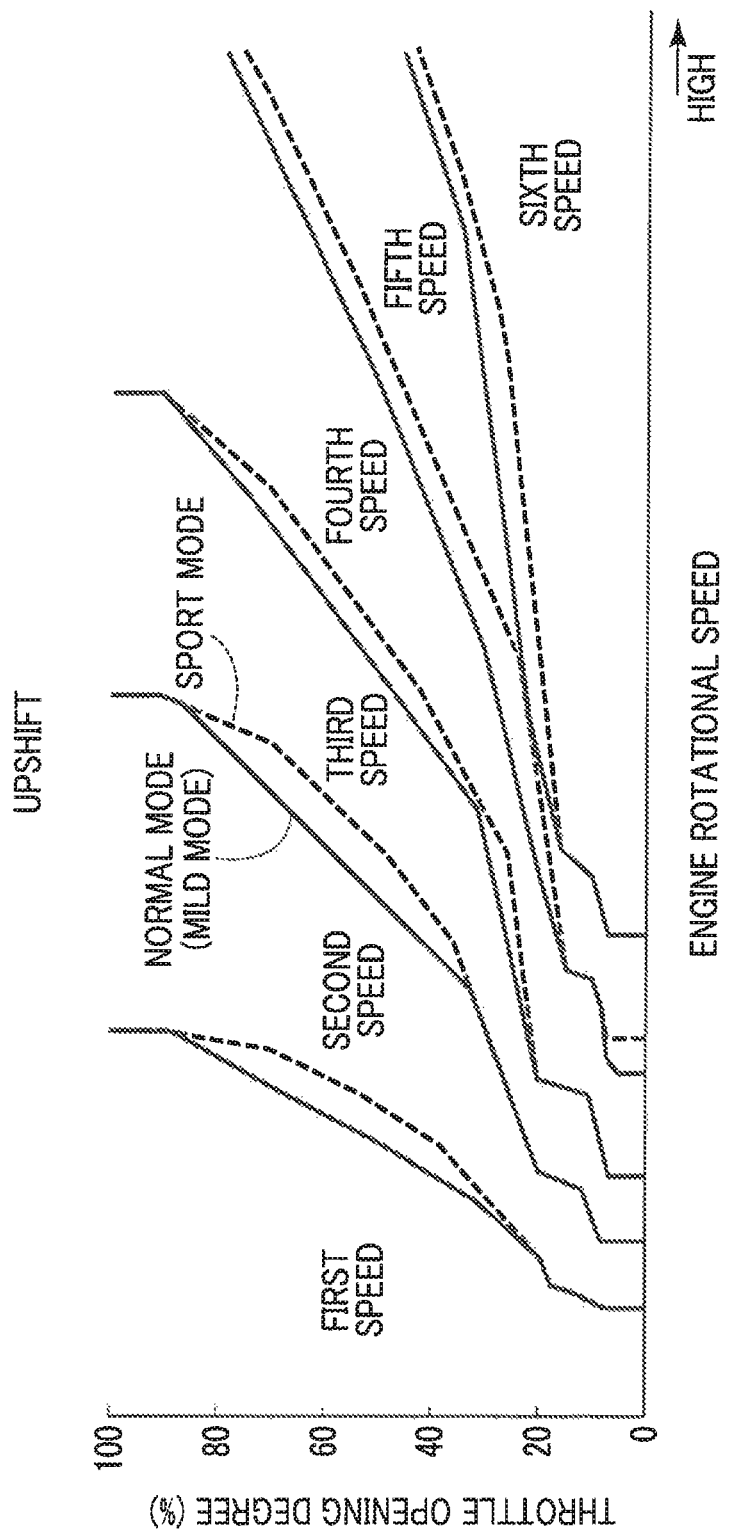
FIG. 5 is a shift diagram representing how an engine rotational speed and a throttle opening degree are related to the respective shift stages in the case of an upshift in the embodiment of the disclosure shown in FIG. 3.
Figure 6:
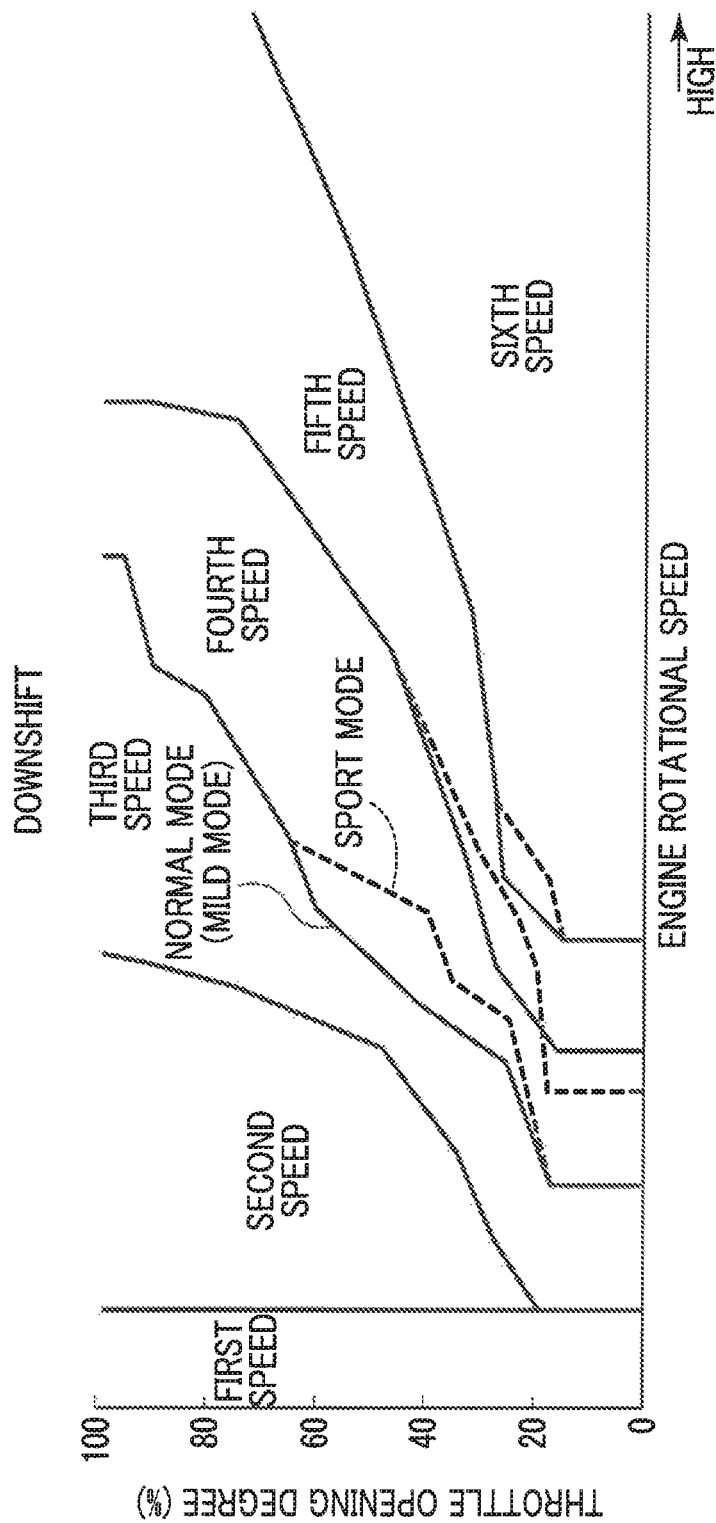
FIG. 6 is a shift diagram representing how the engine rotational speed and the throttle opening degree are related to the respective shift stages in the case of a downshift in the embodiment of the disclosure shown in FIG. 3.
Figure 7:
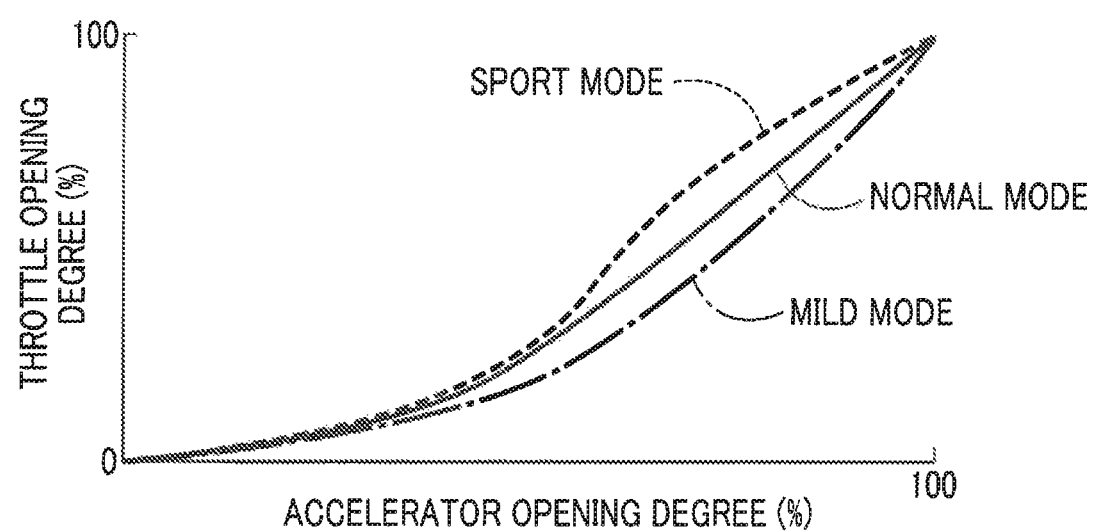
FIG. 7 is a graph schematically representing a relationship between an accelerator opening degree and the throttle opening degree in the embodiment of the disclosure shown in FIG. 3.

In the present embodiment of the disclosure, the driver can select one of a sport mode, a normal mode and a mild mode as a shift mode by operating a shift mode selection switch 31 that is arranged in a vehicle interior (not shown). FIG. 5 is a shift diagram in the case of an upshift in the normal mode, the mild mode and the sport mode, and FIG. 6 is a shift diagram in the case of a downshift in the normal mode, the mild mode and the sport mode. In each of FIGS. 5 and 6, the normal mode and the mild mode are indicated by solid lines, and the sport mode is indicated by a broken line. The sport mode as the second shift mode in the disclosure has a region where a region of the same shift stage is offset toward an engine rotational speed that is higher than in the normal mode as the first shift mode in the disclosure at the same throttle opening degree. Operation regions of respective shift stages are set such that changeover control for making a changeover between the shift stages is performed based on the throttle opening degree and the engine rotational speed in the first shift mode and the second shift mode. The shift diagram in the mild mode is exactly the same as the shift diagram in the normal mode, but the ratio of the throttle opening degree to the accelerator opening degree is set smaller in the mild mode than in the normal mode. Therefore, a shift is more difficult to make in the mild mode than in the normal mode. As a result, the magnitude of a shock caused at the time of shifting can be made smaller in the mild mode than in the normal mode. FIG. 7 schematically shows such a relationship between the accelerator opening degree and the throttle opening degree. In FIG. 7, a solid line indicates the normal mode, a broken line indicates the sport mode, and an alternate long and short dash line indicates the mild mode. As is also apparent from FIG. 7, the throttle opening degree corresponding to the accelerator opening degree is set larger in the sport mode than in the normal mode.

An oil pressure control unit 15*c* of the ECU 15 controls engagement/release and the like of the frictional engagement elements C1 to C4, B1 and B2 and a lockup clutch 56 that will be described later via an oil pressure control circuit 90 such that a shift stage corresponding to a shift mode selected by the driver is achieved, based on the engine rotational speed and the throttle opening degree.

In the present embodiment of the disclosure, one of a sport mode, a normal mode and an economy mode can be selected as a shift mode, but the disclosure is not limited thereto. Only two modes, namely, the sport mode and the normal mode may be available as the shift mode. Besides, if necessary, any mode can also be freely set. As described hitherto, it goes without saying that the pattern of the shift modes and the relationship between the accelerator opening degree and the throttle opening degree in each of the shift modes are nothing more than an example, and can be arbitrarily changed in accordance with the required purpose or the like.

The torque converter 50 in the present embodiment of the disclosure is a general torque converter that is equipped with a pump impeller 52, the turbine runner 51, a stator 53 and a torque converter case 54 that accommodates the pump impeller 52, the turbine runner 51 and the stator 53. The turbine runner 51, which is opposed to the pump impeller 52 that is provided integrally with the torque converter case 54, is coupled to the input shaft 43 of the automatic transmission 40. The stator 53, which is interposed between the turbine runner 51 and the pump impeller 52, is attached to the transmission case 42 via a one-way clutch 55. The lockup clutch 56, which can integrally connect the pump impeller 52 and the turbine runner 51 to each other hydraulically, is provided between the turbine runner 51 and the torque converter case 54. In order to engage/cancel the engagement of this lockup clutch 56, two ports for supplying/discharging automatic transmission oil, namely, an engagement cancellation port 57 and an engagement port 58 are provided through the torque converter case 54 that is coupled to the output shaft $E_O$ of the engine E.

Figure 8:
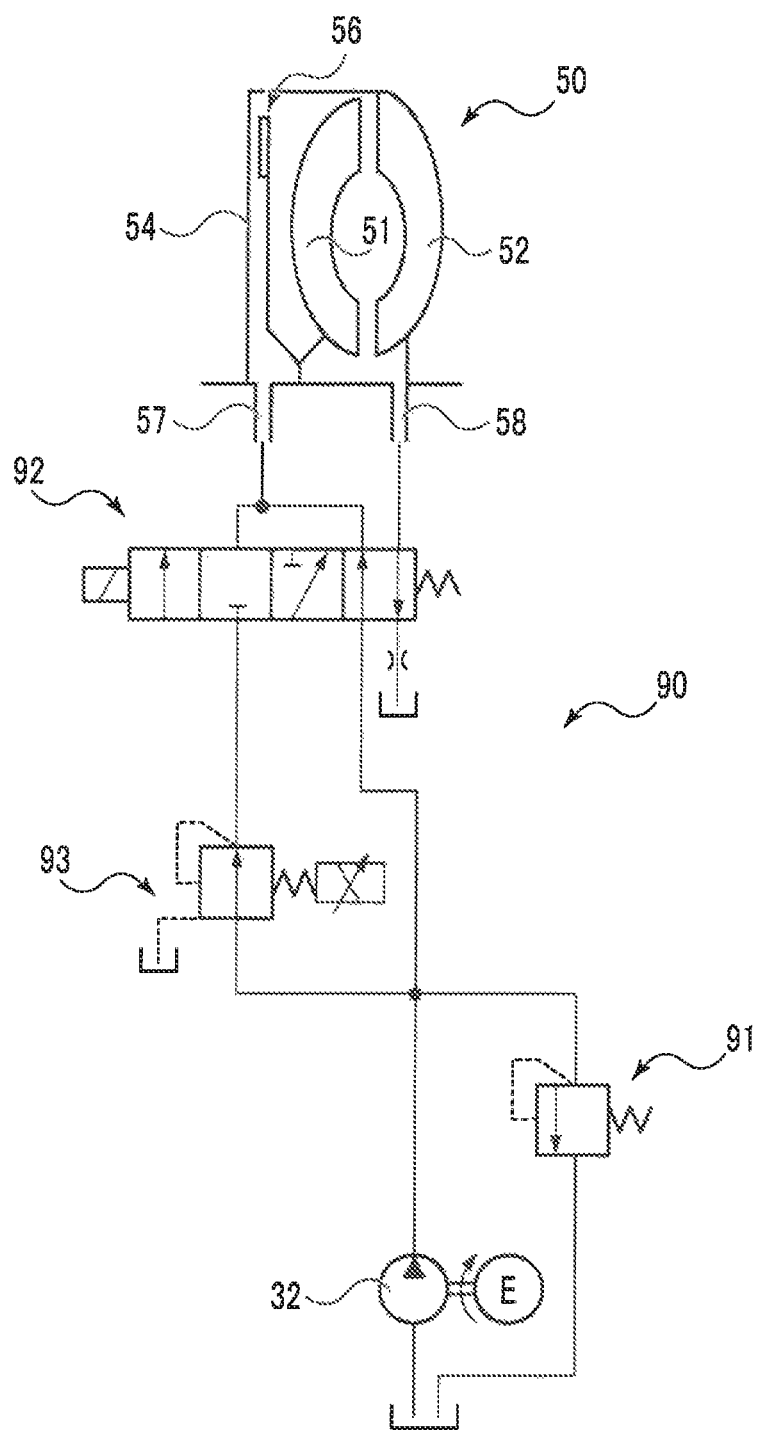
FIG. 8 is a hydraulic circuit diagram schematically representing the configuration of a main part of an oil pressure control circuit for realizing complete engagement, slip engagement and complete release of a lockup clutch in the embodiment of the disclosure shown in FIG. 3.

FIG. 8 schematically shows the configuration of a main part of the oil pressure control circuit 90 in the present embodiment of the disclosure for engaging and releasing the above-mentioned lockup clutch 56. A mechanical oil pump 32 is coupled to the engine E, and hence operates in tandem with the operation of the engine E. A line pressure that is generated by this mechanical oil pump 32 and that is adjusted by a pressure adjusting valve 91 is supplied to the engagement cancellation port 57 and the engagement port 58 of the lockup clutch 56.

An electromagnetic changeover valve 92 for changing over a connection state of the lockup clutch 56 is arranged between the mechanical oil pump 32 on the one hand and the engagement port 58 and the engagement cancellation port 57 of the torque converter 50 on the other hand. Besides, an electromagnetic proportional pressure-reducing valve 93 for adjusting an oil pressure that is supplied to the engagement cancelation port 57 of the lockup clutch 56 is arranged between this electromagnetic changeover valve 92 and the mechanical oil pump 32. When not energized, the electromagnetic changeover valve 92 in the present embodiment of the disclosure supplies a line pressure to the engagement cancellation port 57 of the torque converter 50, and connects the engagement port 58 of the torque converter 50 to an oil discharge side to render the torque converter 50 in a complete release state. On the contrary, when energized, the electromagnetic changeover valve 92 supplies a line pressure to the engagement port 58 of the torque converter 50, and supplies the line pressure to the engagement cancellation port 57 via the electromagnetic proportional pressure-reducing valve 93. At this time, the lockup clutch 56 can be rendered in a complete engagement state or a slip engagement state by controlling the operation of the electromagnetic proportional pressure-reducing valve 93. That is, the oil pressure control unit 15*c* of the aforementioned ECU 15, the mechanical oil pump 32, the engagement cancellation port 57 and the engagement port 58 of the torque converter 50, the electromagnetic changeover valve 92 and the electromagnetic proportional pressure-reducing valve 93 of the oil pressure control circuit 90 and the like control lockup.

The complete engagement state of the lockup clutch 56 is a state where the differential pressure between the engagement cancellation port 57 and the engagement port 58 to which a line pressure is directly supplied is maximized.

Besides, the slip engagement state in this present embodiment of the disclosure means a state where the pump impeller 52 and the turbine runner 51 of the torque converter 50 rotate relatively to each other with a mechanical frictional force of the lockup clutch 56.

The operation region of the vehicle in which the lockup clutch 56 is in the complete engagement state will be referred to hereinafter as a complete engagement operation region, and the operation region of the vehicle in which the lockup clutch 56 is in the slip engagement state will be referred to hereinafter as a slip engagement operation region. Besides, the operation region of the vehicle in which the lockup clutch 56 is in the complete release state will be referred to as a complete release operation region.

Figure 9:
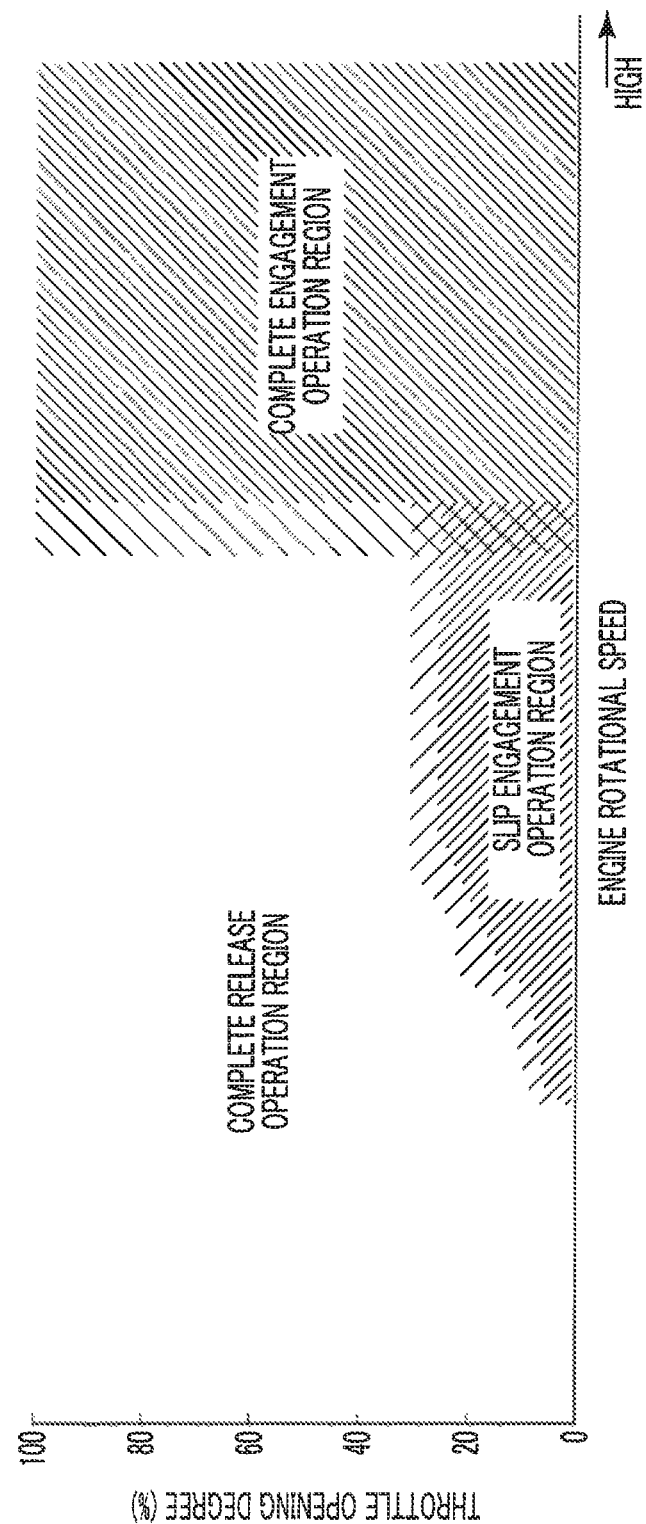
FIG. 9 is a map schematically representing how the engine rotational speed and the throttle opening degree are related to a complete release operation region, a complete engagement operation region and a slip engagement operation region of the vehicle in the embodiment of the disclosure shown in FIG. 3.

The complete release operation region of the vehicle in which the lockup clutch 56 is in the complete release state includes at least one of operating states a) to c) that will be mentioned below, but is not limited thereto. In the operating state a), the vehicle is not in the complete engagement operation region or the slip engagement operation region. In the operating state b), the coolant temperature or the oil temperature of automatic transmission oil is too low. In the operating state c), the oil temperature of automatic transmission oil is too high. The vehicle is in the complete engagement operation region basically when the engine rotational speed is equal to or higher than a predetermined value, for example, a case where the engine rotational speed is equal to or higher than 3400 rounds per minute when rising, and a case where the engine rotational speed is equal to or higher than 3300 rounds per minute when falling, but is not limited thereto. Besides, the case where the vehicle is in the slip engagement operation region includes a case where the engine rotational speed is equal to or higher than 1200 rounds per minute and the throttle opening degree is equal to or smaller than a predetermined value, for example, equal to or smaller than 25% when increasing and equal to or smaller than 30% when decreasing, but is not limited thereto. This complete engagement operation region and this slip engagement operation region of the vehicle are stored in the ECU 15 as a map as shown in FIG. 9. The oil pressure control unit 15c of the ECU 15 makes a changeover among complete engagement, slip engagement and complete release of the lockup clutch 56 via the oil pressure control circuit 90, based on the engine rotational speed and the throttle opening degree.

When the coolant temperature or the oil temperature of automatic transmission oil is too low, for example, when this coolant temperature or this oil temperature is equal to or lower than 20° C., the output torque of the engine E is unstable, so the lockup clutch 56 is rendered in the complete release state. Besides, when the oil temperature of the automatic transmission 40 is too high, for example, equal to or higher than 120° C., there is an apprehension about a decrease in the durability of a friction material constituting the lockup clutch 56, so the lockup clutch 56 is rendered in the complete release state. From this point of view, a coolant temperature sensor 33 that detects a temperature of engine coolant and that outputs this detected temperature to the ECU 15, and an oil temperature sensor 34 that detects an oil temperature of automatic transmission oil and that outputs this detected oil temperature to the ECU 15 are provided in the present embodiment of the disclosure.

Figure 10:
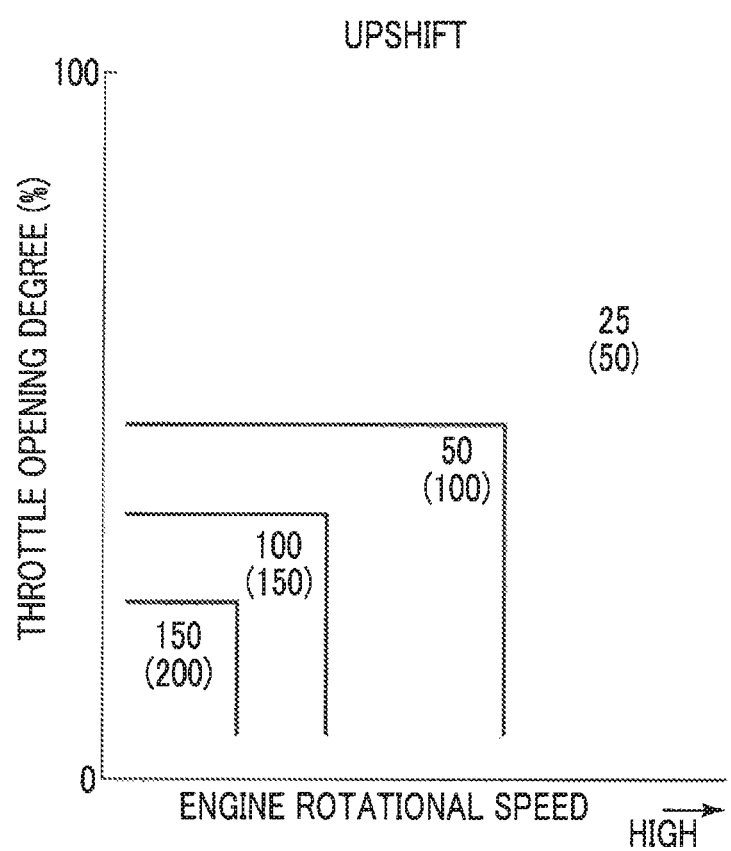
FIG. 10 is a map schematically representing how the engine rotational speed and the throttle opening degree are related to a target slip amount of a torque converter making an upshift in the slip engagement operation region of the vehicle in the embodiment of the disclosure shown in FIG. 3.
Figure 11:
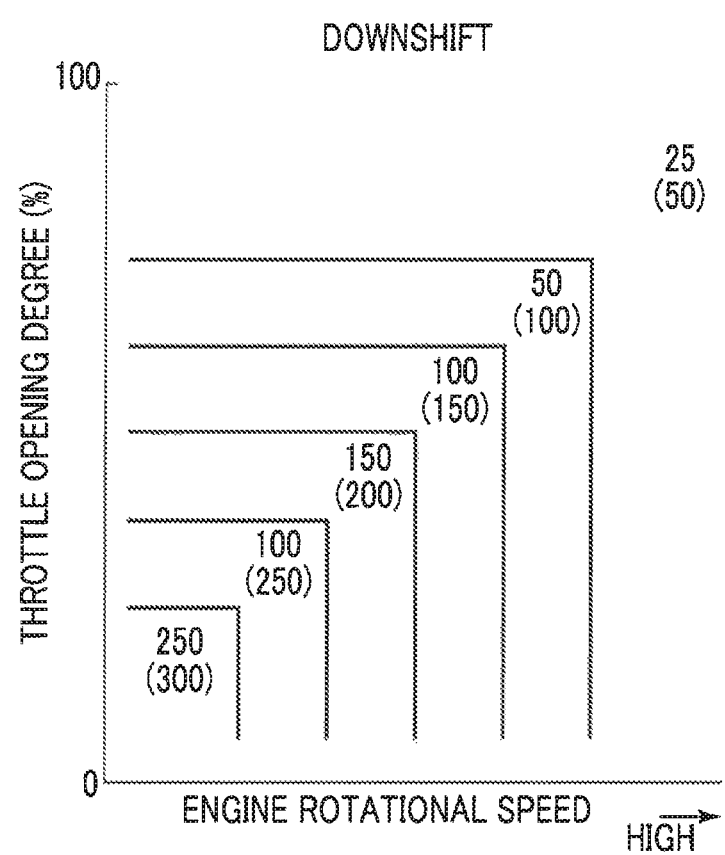
FIG. 11 is a map schematically representing how the engine rotational speed and the throttle opening degree are related to the target slip amount of the torque converter in making a downshift in the slip engagement operation region of the vehicle in the embodiment of the disclosure shown in FIG. 3.

An appropriate value corresponding to the operating state of the vehicle is selected as a rotational difference between the pump impeller 52 and the turbine runner 51 of the torque converter 50 in the slip engagement operation region of the vehicle, namely, a slip amount $\Delta N$ of the torque converter 50. Therefore, a torque converter input shaft rotational speed sensor 35 and a torque converter output shaft rotational speed sensor 36, which detect rotational speeds of the pump impeller 52 side and the turbine runner 51 side of the torque converter 50 respectively and output these rotational speeds to the ECU 15, are provided. A target slip amount $\Delta N_R$ of the torque converter 50 in the slip engagement operation region of the vehicle is stored in advance in the ECU 15 as maps as shown in FIGS. 10 and 11, which are set based on the engine rotational speed and the throttle opening degree. The oil pressure control unit 15c of the ECU 15 can control the slip amount $\Delta N$ of the torque converter 50 to the target slip amount $\Delta N_R$ that is acquired from FIGS. 9 and 10, by adjusting the oil pressure of hydraulic oil supplied to the engagement cancellation port 57 through the use of the electromagnetic proportional pressure-reducing valve 93. The numbers in the parentheses in FIGS. 9 and 10 indicate the target slip amount $\Delta N_S$ in performing shift control in the slip engagement operation region.

Incidentally, when the lockup clutch 56 is switched from the complete release state or the slip engagement state to the complete engagement state, the operation of the electromagnetic proportional pressure-reducing valve 93 is controlled such that no shock occurs at the time of engagement as a result of a gradual fall in the oil pressure of hydraulic oil supplied to the engagement cancellation port 57.

In the present embodiment of the disclosure, when shift operation is performed in the complete engagement operation region of the vehicle, the control of switching the lockup clutch 56 to the slip engagement state in accordance with the operating state of the vehicle is performed. Besides, when shift operation is performed in the slip engagement operation region of the vehicle, the control of further increasing the target slip amount $\Delta N_R$ of the lockup clutch 56 to $\Delta N_S$ in accordance with the operating state of the vehicle is performed. In other words, when shift operation is performed in the complete release operating state of the vehicle, no such control is performed.

More specifically, when the lockup clutch 56 is in the complete engagement state in making a changeover between the shift stages with the normal mode selected, the shock occurring at the time of shifting is alleviated by switching this lockup clutch to the slip engagement state. Besides, when the lockup clutch 56 is in the slip engagement state, the slip engagement state of the lockup clutch 56 is changed such that the slip amount $\Delta N$ of the torque converter 50 becomes larger than before making a changeover between the shift stages. On the other hand, when the lockup clutch 56 is in the complete engagement state in making a changeover between the shift stages with the sport mode selected, shift operation is completed at an early stage while this lockup clutch is held in the complete engagement state. Besides, when the slip amount $\Delta N$ of the torque converter 50 is larger than a predetermined slip amount (hereinafter referred to as a slip threshold amount) $N_D$ with the lockup clutch 56 in the slip engagement state, the occurrence of an excessive shift shock is avoided while the lockup clutch 56 is held in the slip engagement state. On the contrary, when the slip amount $\Delta N$ of the torque converter 50 is equal to or smaller than the slip threshold amount $N_D$, shift operation is completed at an early stage while the lockup clutch is switched to the complete engagement state.

Figure 12:
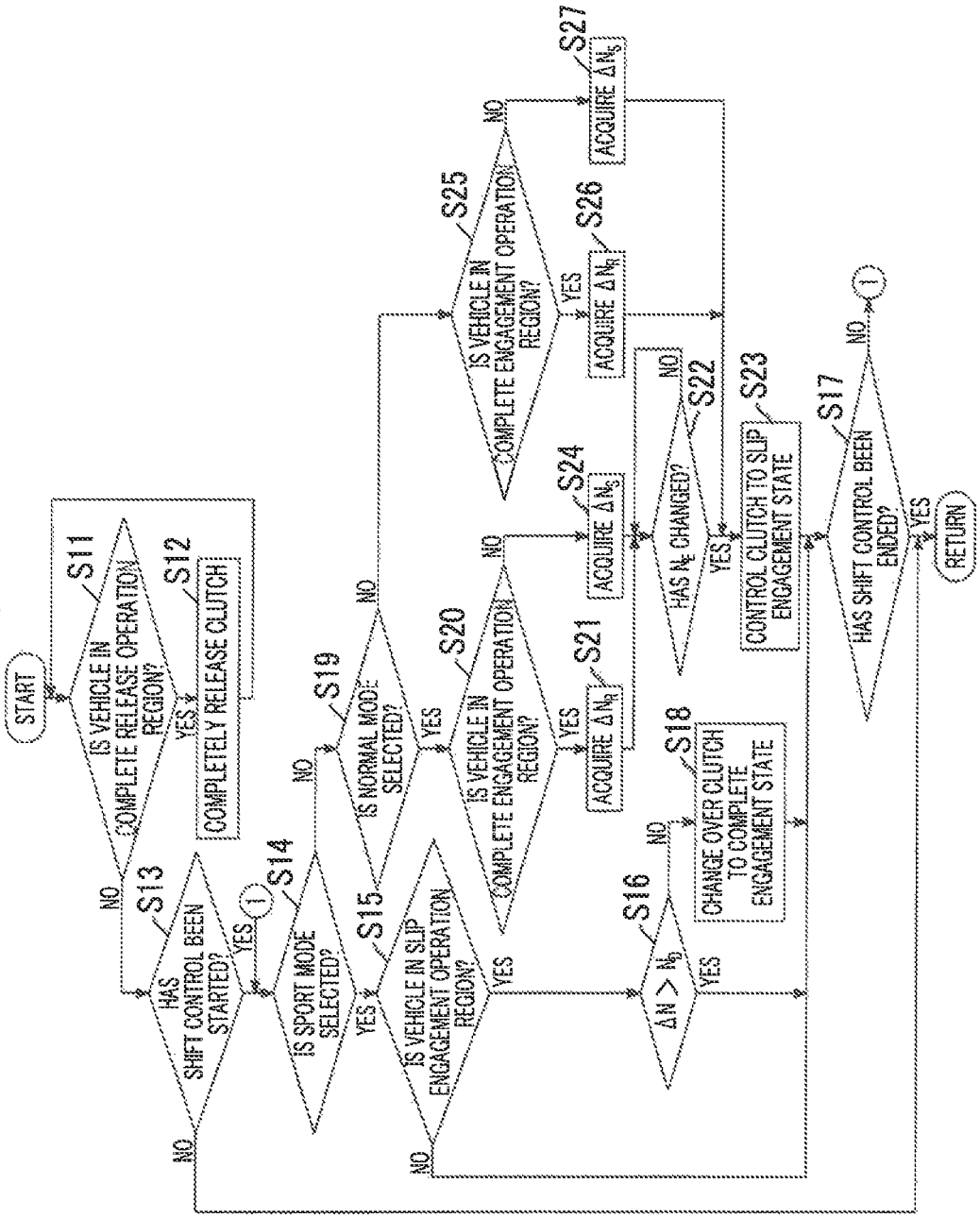
FIG. 12 is a flowchart showing a control procedure for making a changeover among complete release, slip engagement and complete engagement of the lockup clutch in the embodiment of the disclosure shown in FIG. 3.

A control procedure of the lockup clutch 56 in the present embodiment of the disclosure described hitherto will be described based on a flowchart shown in FIG. 12. First of all, it is determined in step S11 whether or not the vehicle is in the complete release operation region. It should be noted herein that if it is determined that the vehicle is in the complete release operation region, a transition to step S12 is made to render the lockup clutch 56 in the complete release state. After that, a return to step S11 is made to wait for the vehicle to exit the complete release operation region.

If it is determined in the foregoing step S11 that the vehicle is not in the complete release operation region, namely, that the vehicle is in the complete engagement operation region or the slip engagement operation region, a transition to step S13 is made to determine Whether or not shift control has been started based on a shift command. If it is determined that shift control has been started, a transition to step S14 is made to further determine whether or not the driver has selected the sport mode as a shift mode. Besides, if it is determined in step S13 that shift control has not been started, a return to step S11 is made again to repeat the aforementioned process.

If it is determined in step S14 that the sport mode is selected, a transition to step S15 is made to determine whether or not the vehicle is in the slip engagement operation region. It should be noted herein that if it is determined that the vehicle is in the slip engagement operation region, a transition to step S16 is made to determine whether or not the slip amount $\Delta N$ of the torque converter 50 is larger than the slip threshold amount $N_D$. It should be noted herein that if it is determined that the slip amount $\Delta N$ of the torque converter 50 is larger than the slip threshold amount $N_D$, namely, that some shift shock is acceptable, a transition to step S17 is made to determine whether or not shift control has been completed. It should be noted herein that if it is determined that shift control has been completed, namely, that a changeover between the shift stages has been ended, a return to step S11 is made to repeat the aforementioned process. Besides, if it is determined in the foregoing step S15 that the vehicle is not in the slip engagement operation region, namely, that the vehicle is in the complete engagement operation region, a transition to step S17 is made to repeat the aforementioned process.

If it is determined in step S16 that the slip amount $\Delta N$ of the torque converter 50 is equal to or smaller than the slip threshold amount $N_D$, namely, that no great shock occurs even when the lockup clutch 56 is switched to the complete engagement state, a transition to step S18 is trade. Then, the lockup clutch 56 is changed over to the complete engagement state, and a transition to step S17 is made to repeat the aforementioned process.

As described hitherto, when shift operation is performed in the complete engagement operation region or the slip engagement operation region with the sport mode selected by the driver, the occurrence of a shift shock is permitted to some extent, and shift operation is smartly performed.

On the other hand, if it is determined in the foregoing step S17 that shift control has not been completed, a return to step S14 is made again to determine whether or not the driver has continued to select the sport mode, namely, whether or not the driver has changed the shift mode during shift control, it should be noted herein that if it is determined that the driver has not selected the sport mode, a transition to step S19 is made to determine in turn whether or not the driver has selected the normal mode. It should be noted herein that if it is determined that the normal mode has been selected, a transition to step S20 is made to determine whether or not the vehicle is in the complete engagement operation region. Then, if it is determined that the vehicle is in the complete engagement operation region, a transition to step S21 is made to acquire the target slip amount $\Delta N_R$ of the torque converter 50 corresponding to the slip engagement operation region of the vehicle. After that, it is determined in step S22 whether or not the engine rotational speed $N_E$ has changed. It should be noted herein that if it is determined that the engine rotational speed $N_E$ has changed, namely, that the engine rotational speed $N_E$ has fallen in the case of an upshift and that the engine rotational speed $N_E$ has started to rise in the case of a downshift, a transition to step S23 is made. Then, the lockup clutch 56 is controlled to the slip engagement state such that the acquired target slip amount $\Delta N_R$ is obtained, and a transition to the foregoing step S17 is made to repeat the aforementioned process.

Besides, if it is determined in step S20 that the vehicle is not in the complete engagement operation region, namely, that the vehicle is in the slip engagement operation region, a transition to step S24 is made. Then, a target slip amount $\Delta N_S$ of the torque converter 50 that is larger than the foregoing target slip amount $\Delta N_R$ is acquired to suppress the occurrence of a shift shock, and then a transition to step S22 is made to repeat the aforementioned process.

As described hitherto, when shift operation is performed in the complete engagement operation region with the normal mode selected by the driver, a change in the engine rotational speed $N_E$ is awaited, and the lockup clutch 56 is controlled to the slip engagement state. Besides, when shift operation is performed in the slip engagement operation region with the normal mode selected by the driver, a change in the engine rotational speed. $N_E$ is awaited, and the lockup clutch 56 is controlled to the slip engagement state with the larger target slip amount $\Delta N_S$. Therefore, the magnitude of a shift shock can be made smaller than in the sport mode at the time of shifting. incidentally, as a matter of course, it is also possible to utilize detected information from the torque converter input shaft rotational speed sensor 35 instead of the aforementioned engine rotational speed $N_E$.

On the other hand, if it is determined in the foregoing step S19 that the driver has not selected the normal mode, namely, that the driver has selected the mild mode, a transition to step S25 is made to determine whether or not the vehicle is in the complete engagement operation region. Then, if it is determined that the vehicle is in the complete engagement operation region, a transition to step S26 is made to acquire the target slip amount $\Delta N_R$ of the torque converter 50 corresponding to the slip engagement operation region of the vehicle, and then a transition to step S23 is made. Then, the lockup clutch 56 is controlled to the slip engagement state such that the acquired target slip amount $\Delta N_R$ is obtained, and a transition to the foregoing step S17 is made to repeat the aforementioned process.

Besides, if it is determined in step S25 that the vehicle is not in the complete engagement operation region, namely, that the vehicle is in the slip engagement operation region, a transition to step S27 is made. Then, the target slip amount $\Delta N_S$ of the torque converter 50 that is larger than the foregoing target slip amount $\Delta N_R$ is acquired to suppress the occurrence of a shift shock, and then a transition to step S23 is made to repeat the aforementioned process.

As described hitherto, when shift operation is performed in the complete engagement operation region with the mild mode selected by the driver, the lockup clutch 56 is immediately controlled to the slip engagement state. When shift operation is performed in the slip engagement operation region, the lockup clutch 56 is immediately controlled to the slip engagement state with the larger target slip amount $\Delta N_S$. Therefore, the magnitude of a shift shock can be made still smaller than in the sport mode or the normal mode at the time of shifting.

Incidentally, the disclosure should be interpreted only from what is described in the claims thereof In the aforementioned embodiment of the disclosure as well, all the alterations and modifications encompassed in the concept of the disclosure are possible in addition to the matters mentioned therein. That is, all the matters in the aforementioned embodiment of the disclosure are not intended to limit the disclosure, but can be arbitrarily changed according to the usage, purpose and the like of the disclosure, including configurations that are not directly relevant to the disclosure.

What is claimed is:

1. A control apparatus for a vehicle, the vehicle including
an engine,
a torque converter connected to the engine, the torque converter including a pump impeller and a turbine runner,
a lockup clutch provided between the pump impeller and the turbine runner, the lockup clutch being configured to change over to one of a complete engagement state, a slip engagement state and a complete release state in accordance with an operating state of the vehicle, and
an automatic transmission connected to the engine via the torque converter, the automatic transmission including shift stages, the automatic transmission being configured such that a first shift mode or a second shift mode is selected by a driver, a region of each of the shift stages being set such that, at the same throttle opening degree and the same shift stage, the region in the second shift mode is offset toward a higher engine speed side with respect to the region in the first shift mode,
the control apparatus comprising
an electronic control unit configured to
  i) hold the lockup clutch in the complete engagement state when the second shift mode is selected and a changeover between the shift stages is made with the lockup clutch being in the complete engagement state, and
  ii) hold the lockup clutch in the slip engagement state or switch the lockup clutch to the complete engagement state, when the second shift mode is selected and a changeover between the shift stages is made with the lockup clutch being in the slip engagement state.

2. The control apparatus according to claim 1, wherein
the electronic control unit is configured to, when the second shift mode is selected and a changeover between the shift stages is made with the lockup clutch being in the slip engagement state,
  i) hold the lockup clutch in the slip engagement state when a rotation difference between the pump impeller and the turbine runner of the torque converter is larger than a predetermined rotation difference, and
  ii) switch the lockup clutch to the complete engagement state when the rotation difference between the pump impeller and the turbine runner of the torque converter is equal to or smaller than the predetermined rotation difference.

3. The control apparatus according to claim 1, wherein
the electronic control unit is configured to
  i) switch the lockup clutch to the slip engagement state when the first shift mode is selected and a changeover between the shift stages is made with the lockup clutch being in the complete engagement state, and
  ii) hold the lockup clutch in the slip engagement state when the first shift mode is selected and a changeover between the shift stages is made with the lockup clutch being in the slip engagement state.

4. The control apparatus according to claim 3, wherein
the electronic control unit is configured to switch the lockup clutch to the slip engagement state after a rotational speed of the pump impeller of the torque converter changes, when the first shift mode is selected and a changeover between the shift stages is made with the lockup clutch being in the complete engagement state.

5. The control apparatus according to claim 3, wherein
the electronic control unit is configured to control the lockup clutch such that a rotation difference between the pump impeller and the turbine runner of the torque converter after a changeover between the shift stages is made becomes larger than the rotation difference between the pump impeller and the turbine runner of the torque converter before the changeover between the shift stages is made, when the first shift mode is selected and the changeover between the shift stages is made with the lockup clutch being in the slip engagement state.

6. The control apparatus according to claim 1, wherein
the electronic control unit is configured to hold the lockup clutch in the complete release state regardless of a changeover between the shift stages, when the lockup clutch is in the complete release state.

7. The control apparatus according to claim 1, wherein
the electronic control unit is configured to control the lockup clutch such that the lockup clutch is in the complete release state, when at least one of an engine coolant temperature and an oil temperature of automatic transmission oil is equal to or lower than a first predetermined temperature or when the oil temperature of the automatic transmission oil is equal to or higher than a second predetermined temperature that is higher than the first predetermined temperature.

8. A control method for a vehicle, the vehicle including
an engine,
a torque converter connected to the engine, the torque converter including a pump impeller and a turbine runner,
a lockup clutch provided between the pump impeller and the turbine runner, the lockup clutch being configured to change over to one of a complete engagement state, a slip engagement state and a complete release state in accordance with an operating state of the vehicle,
an automatic transmission connected to the engine via the torque converter, the automatic transmission including shift stages, the automatic transmission being configured such that a first shift mode or a second shift mode is selected by a driver, a region of each of the shift stages being set such that, at the same throttle opening degree and the same shift stage, the region in the second shift mode is offset toward a higher engine speed side with respect to the region in the first shift mode, and
an electronic control unit,
the control method comprising
  i) holding the lockup clutch in the complete engagement state by the electronic control unit when the second shift mode is selected and a changeover between the shift stages is made with the lockup clutch being in the complete engagement state, and
  ii) holding the lockup clutch in the slip engagement state or switching the lockup clutch to the complete engagement state, by the electronic control unit, when the second shift mode is selected and a changeover between the shift stages is made with the lockup clutch being in the slip engagement state.

\* \* \* \* \*